Aug. 26, 1969 HIROSHI SAKURAI 3,462,941

SECONDARY CLOCK APPARATUS

Filed Feb. 13, 1967

INVENTOR.

Hiroshi Sakurai

BY

Ernest G. Montague

Attorney 3,462,941
SECONDARY CLOCK APPARATUS
Hiroshi Sakurai, Tokyo, Japan, assignor to Amano Corporation, Kanagawa-ken, Japan
Filed Feb. 13, 1967, Ser. No. 615,400
Int. Cl. G04c 13/08
U.S. Cl. 58—26 2 Claims

ABSTRACT OF THE DISCLOSURE

A secondary clock apparatus having a discriminator which produces a positive electric potential or a negative electrical potential depending upon whether the frequency of the input signal is high or low. Control transistors are connected in parallel to the output side of the discriminator. One of the control transistors conducts current when a negative potential appears at the control terminal or base and the other of the control transistors conducts current when a positive potential appears at the control terminal or the base. Relays connected to the output sides of the control transistors are disposed in conducting circuits and their contacts are in electrical circuits which connnect the relays to a hand moving magnet or a correction magnet for the hands of a secondary clock.

The present invention relates to a secondary clock apparatus in general, and to a secondary clock apparatus which operates normally by a signal of one frequency, and operates to correct an error by a signal of another frequency, two kinds of signals differing in frequency being selectively provided by a master clock in particular.

It is an object of the present invention to provide a circuit of a secondary clock drive means and a means for transmitting clock signals, comprising a signal receiver circuit having a frequency discriminator circuit, which upon receiving two signals of different frequencies, discriminates the signals to time signals and correcting signals, that is, a single receiver can take out two signals. A hand forwarding magnet and a time correcting magnet are actuated by the discriminations using, for example, an NPN-type transistor and a PNP-type transistor, respectively. A primary clock provides signal pulses, for forwarding the hands and pulses for correcting the time, to a signal transmitter. These signals are modulated (biased or shifted) into the two signals of different frequencies, namely, to positive signals or negative signals, centering around a center frequency $f_0$ of the frequency discriminator circuit of the receiver, and are transmitted through the power supply circuit to the clock signal receiver circuit.

With the above and other objects in view, which will become apparent in the following detailed description, the present invention will be clearly understood in connection with the accompanying drawing, in which.

Figure 1:
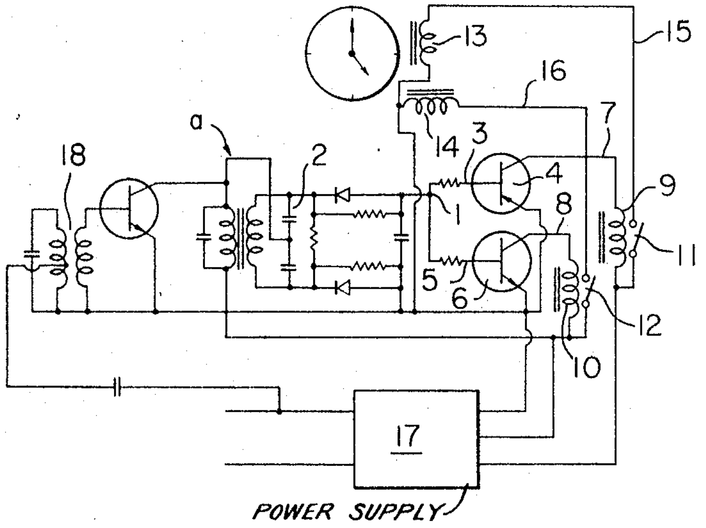
FIGURE 1 is a circuit diagram of an embodiment of the present invention.

Referring now to the drawing, a secondary clock equipment comprises a signal receiver circuit including a discriminator 2 which produces a positive electric potential or a negative electric potential depending upon whether the frequency of the input signal is high or low, and first and second control transistors 4 and 6 which are connected in parallel to the output side of the discriminator 2. The first control transistor 4 conducts current when a negative potential appears at the control terminal or the base 3 and the second control transistor 6 conducts current when a positive potential appears at the control terminal or the base 5. Relays 9 and 10 are connected in conducting circuits 7 and 8, respectively, and the relays 9 and 10 are connected with their relay contacts 11 and 12 in electric relay circuits 15 and 16, respectively, which connect the relays to a hands moving magnet 13 or a correction magnet 14. A rectified power supply 17 is provided, for example, with 100~115 volts, 50~60 c./s. AC power and a tank circuit 18 at the input side.

Figure 2:
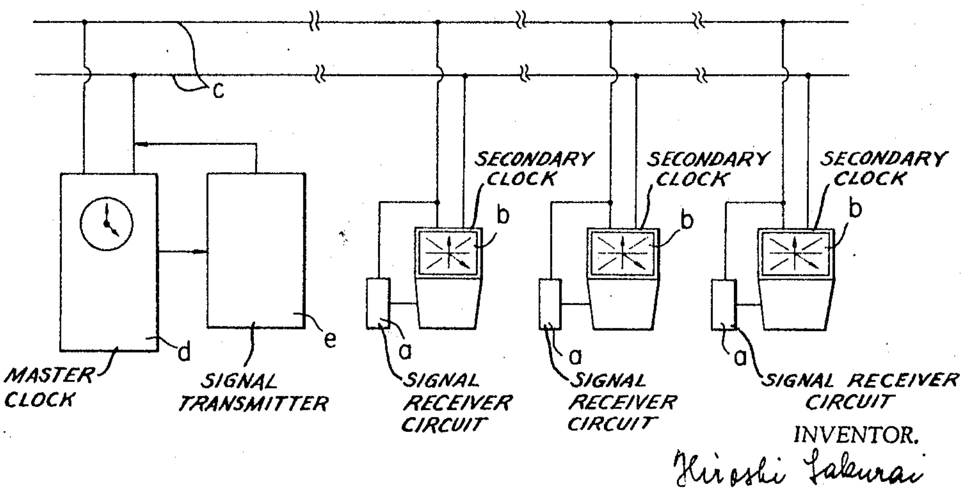
FIG. 2 is a wiring diagram relating to a master clock.

Referring now to the drawing, and more particularly to FIG. 2, a connection of three secondary clocks *b* having the above mentioned control circuit, is illustrated through power cables *c* of a 100~115 volts, 50~60 c./s. AC power source to a transmitter of a common master clock *d*. The transmitter is composed of suitable circuits producing two kinds of signals of higher and lower frequencies, selectively, and these signals are conducted to the signal receiver circuits *a* of each secondary clock *b* through the power cables *c*.

This equipment is usually supplied, for instance, with a higher frequency input at its input side, so that the hands forwarding magnet 13 is excited intermittently and a normal hand movement is performed. When the hands operate improperly as a result of some trouble or other fault, a lower frequency input is supplied at the input side and a correction movement is provided to the hands by the correction magnet 14. Thus, according to the present invention, the normal movement or the correction movement is freely performed on the hands, merely by switching the input signal frequency to a higher frequency or a lower frequency and discriminating same by the discriminator 2. Therefore, the present invention has a very simple operation.

I claim:

1. A secondary clock apparatus, for the hands of a secondary clock comprising

- a discriminator means for producing a positive electric potential or a negative electric potential depending upon whether the frequency of an input signal is high or low,
- first and second transistors having first and second control terminals, respectively, connected in parallel to the output side of said discriminator,
- said first transistor conducts current when a negative potential is at said first control terminal,
- said second transistor conducts current when a positive potential is at said second control terminal,
- a first and second conducting circuit connected to the output side of said first and second transistors, respectively,
- a first and second relay connected in said first and second conducting circuits respectively,
- said first and second relays including first and second relay contacts respectively,
- first and second relay circuits having therein said first and second relay contacts, respectively,
- a hand forwarding magnet in one of said relay circuits operatively connected with the hands of a secondary clock for forwarding thereof, and
- a correction magnet in the other of said relay circuits operatively connected with the hands of the secondary clock for correction movement thereof.

2. A secondary clock drive circuit for transmitting clock signals to the hands of a secondary clock, comprising

- a signal transmitter for transmitting two signals of different frequencies,
- a frequency discriminator means for receiving and discriminating said two signals of different frequencies into a time signal and a correcting signal, respectively,
- an NPN transistor and a PNP transistor connected at their bases in parallel to the output side of said frequency discriminator means, a hand forwarding magnet operatively connected to the output side of said NPN transistor and operatively connected to the hands of a secondary clock for forwarding the hands of the secondary clock, a correction magnet operatively connected to the output side of said PNP transistor and operatively connected to the hands of the secondary clock for correction movement thereof, and a master clock means for supplying signals pulses for forwarding and correcting the hands of the secondary clock, respectively, to said signal transmitter for conversion into said two signals of different frequencies, respectively.

References Cited

UNITED STATES PATENTS

| | | | |
|---|---|---|---|
| 1,944,592 | 1/1934 | Bryce ---------------- | 58—26 |
| 2,905,904 | 9/1959 | Sargeant -------------- | 58—24 |
| 3,277,645 | 10/1966 | Hanson --------------- | 58—24 |

RICHARD B. WILKINSON, Primary Examiner

E. C. SIMMONS, Assistant Examiner

U.S. Cl. X.R.

58—24